(No Model.) 2 Sheets—Sheet 1.
W. L. BUSH.
VEHICLE SPRING.
No. 436,398. Patented Sept. 16, 1890.
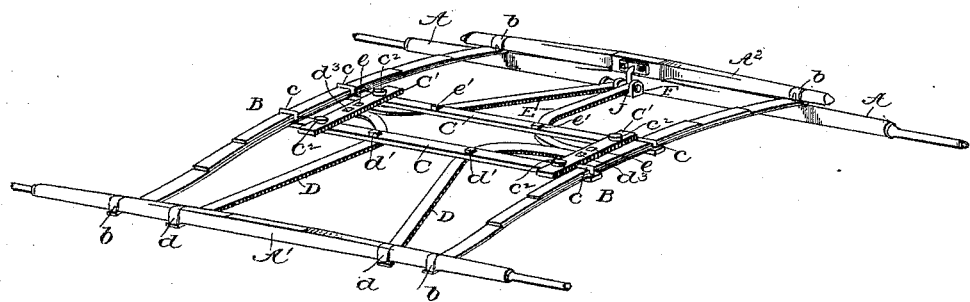

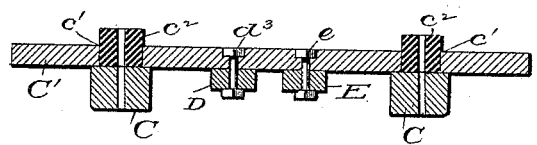

UNITED STATES PATENT OFFICE.

WILLIAM LOUIS BUSH, OF WATERTOWN, NEW YORK, ASSIGNOR OF ONE-HALF TO THE WATERTOWN SPRING WAGON COMPANY, OF SAME PLACE.

VEHICLE-SPRING.

SPECIFICATION forming part of Letters Patent No. 436,398, dated September 16, 1890.

Application filed January 23, 1890. Serial No. 337,786. (No model.)

*To all whom it may concern:*

Be it known that I, WILLIAM LOUIS BUSH, a citizen of the United States, residing at Watertown, in the county of Jefferson and State of New York, have invented certain new and useful Improvements in Vehicle-Springs; and I do hereby declare that the following is a full, clear, and exact description of the invention, which will enable others skilled in the art to which it appertains to make and use the same.

This invention relates to vehicle-springs; and it has for its object to provide simple and improved springs for this purpose, which will impart a perfect yielding motion to the vehicle-body, serve to keep the gear true, and which will possess advantages in point of inexpensiveness, durability, and general efficiency.

In the drawings, Figure 1 is a perspective view of a vehicle embodying my invention, the body and carrying-wheels being removed. Fig. 2 is a vertical longitudinal sectional view thereof. Fig. 3 is an inverted plan view. Fig. 4 is a detail sectional view on the line $xx$, Fig. 3. Fig. 5 is a detail perspective view of the combined clip and spring-shackle. Fig. 6 is a vertical sectional view thereof.

Corresponding parts in the drawings are designated by the same letters of reference.

Referring to the drawings, A A' designate, respectively, the front and rear axles, above the former of which is disposed a bolster $A^2$. To the under side of the bolster and the rear axle are secured the ends of two corresponding side springs B B by clips $b$. These side springs are of the leaf pattern, and are preferably arched from end to end. At about the center the springs B are connected by two cross or body bars C C, located some distance apart and having their ends projecting under the springs and secured thereto by clips $c$. Upon the cross-bars C adjacent to the springs are mounted two parallel longitudinally-disposed bars C' C', provided at their points of intersection with the cross-bars with recesses $c'$ $c'$, within which are seated rubber blocks or cushions $c^2$ $c^2$, upon which the vehicle-body rests. The office of these rubber blocks or cushions is to obviate the jar occasioned by passing over obstructions, and also to prevent the rumbling noise common to vehicles.

D D designate two corresponding intermediate rear springs, secured at their rear ends to the under side of the rear axle by clips $d$ $d$. From their rear secured ends these springs converge slightly forwardly to a point near the rear cross-bar C, from whence they diverge, pass under the rear cross-bar, to which they are secured by bolts $d'$ $d'$, and terminate in outturned ends $d^2$ $d^2$, which are secured by bolts $d^3$ $d^3$ to the under side of the adjacent bars C'. To the under side of the bars C' are also secured by bolts $e$ $e$ the outturned inner ends of two corresponding front intermediate springs E E. These springs turn inwardly from their rear ends and forwardly, passing under the front cross-bar C, and are secured thereto by bolts $e'$ $e'$. From the front cross-bar the springs converge forwardly and come together at their front ends.

F designates my improved combined clip, spring-shackle, and axle-pivot. This device comprises two corresponding bolts $f$ $f$, provided at their upper ends with opposing cross-plates $f'$ $f'$, having bolt-holes $f^2 f^2$, said plates being disposed at the front and rear sides of the bolster $A^2$ and secured thereto by bolts $f^3$ $f^3$. The clip-bolts $f$ project downwardly at either side of the front axle, and below the latter is disposed a clip-tie G, formed of a flat plate and provided with perforations $g$ $g$, through which the bolts pass. The tie is secured in proper position upon the bolts by nuts $g'$ $g'$ and $g^2$ $g^2$, respectively, disposed above and below the same upon the threaded portions of the bolts. The axle is pivoted upon a king-bolt H, passing therethrough and down through a central perforation $h$ in the tie. A fifth-wheel I is disposed between the axle and bolster, said fifth-wheel being of any suitable or preferred construction.

At the rear edge of the clip-tie is provided a horizontal cross-plate J, having central and end lugs or ears $j$ projecting upwardly therefrom and provided with transverse perforations $j'$, through which are passed a bolt J'. This bolt forms the pivot for the front ends of the springs E, said ends being disposed between the lugs and provided with eyes $j^2$ $j^2$ for the reception of the bolt.

The operation and advantages of my invention will be readily understood by those skilled in the art to which it appertains. The side springs permit of the vertical yielding of the vehicle-body, while the central portions of the intermediate springs serve as torsion-springs, thus embodying in one construction the desirable features of both classes of springs.

I claim as my invention—

1. In a vehicle, the combination, with side springs, cross-bars connecting the same, and parallel longitudinally-disposed bars secured upon the cross-bars and carrying the vehicle-body, of front and rear intermediate flat springs having their adjacent ends pivoted to the longitudinal bars, substantially as and for the purpose set forth.

2. In a vehicle, the combination, with side springs, cross-bars connecting the same, and parallel longitudinally-disposed bars secured upon the cross-bars and carrying the vehicle-body, of rear intermediate springs connecting the rear axle with the longitudinal bars, and front intermediate springs connecting the latter bars with the bolster at the front of the vehicle, substantially as and for the purpose set forth.

3. In a vehicle, the combination, with side springs, cross-bars connecting the same, and longitudinally-disposed bars secured upon the cross-bars and carrying the vehicle-body, of rear intermediate flat springs secured to the rear axle and provided with outturned front ends bolted to the longitudinal bars, and intermediate flat springs at the front of the vehicle provided with outturned rear ends bolted to the longitudinal bars adjacent to said rear springs and converging forwardly and pivoted to a common pivot-bolt, substantially as and for the purpose set forth.

4. In a vehicle, the combination of side springs, cross-bars connecting the same, longitudinally-disposed bars mounted on the cross-bars and provided with cushions upon which the vehicle-body rests, and intermediate torsion-springs, substantially as and for the purpose set forth.

5. In a vehicle, the combination of the side springs, cross-bars connecting the same, longitudinally-disposed bars mounted on the cross-bars and provided with cushions upon which the vehicle-body rests, the rear intermediate springs connecting the rear axle with the longitudinal bars, and the front intermediate springs connecting said bars with a bolster, said front and rear intermediate springs being bolted to the cross-bars at their points of intersection therewith, substantially as and for the purpose set forth.

In testimony whereof I affix my signature in presence of two witnesses.

WILLIAM LOUIS BUSH.

Witnesses:
S. T. WOOLWORTH,
GEO. N. S. CAMP.